(12) United States Patent  (10) Patent No.: US 8,764,080 B2
Hardy et al.  (45) Date of Patent: *Jul. 1, 2014

(54) MODULAR BUMPER SYSTEM

(71) Applicant: Omix-Ada, Inc., Suwanee, GA (US)

(72) Inventors: David E. Hardy, Braselton, GA (US); Patrick W. Bennett, Gainesville, GA (US)

(73) Assignee: Omix-Ada, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,143

(22) Filed: Feb. 6, 2013

(65) Prior Publication Data

US 2013/0147215 A1  Jun. 13, 2013

Related U.S. Application Data

(63) Continuation of application No. 12/731,226, filed on Mar. 25, 2010, now Pat. No. 8,393,656, which is a continuation of application No. 12/288,901, filed on Oct. 24, 2008, now Pat. No. 7,703,834.

(51) Int. Cl.
 *B60R 19/03* (2006.01)
(52) U.S. Cl.
 USPC .......................................... 293/117; 293/102
(58) Field of Classification Search
 CPC ........ B60R 19/023; B60R 19/02; B60R 19/04
 USPC ......... 293/102, 144, 142, 143, 155, 154, 115, 293/116, 117
 See application file for complete search history.

(56) References Cited

U.S. PATENT DOCUMENTS

| 3,774,952 A | 11/1973 | Zorn |
| 4,127,295 A | 11/1978 | Robinson |
| 7,021,685 B2 | 4/2006 | Newbill |
| 7,090,267 B2 | 8/2006 | Pendarvis |
| 7,527,308 B2 | 5/2009 | Buniewicz et al. |

OTHER PUBLICATIONS

Essentials Full-Line Catalog for Jeep Vehicles, Summer Edition, 2005, 1 page.
Essential Olympic Bumpers, www.quadratec.com, p. 113.
Team Cherokee, www.teamcherokee.com, 1 page.
Own a Jeep? Catalog—If You Know Jeep, You Know OMIX-ADA/ Rugged Ridge, p. 3.

(Continued)

*Primary Examiner* — Joseph Pape
(74) *Attorney, Agent, or Firm* — Womble Carlyle Sandridge & Rice LLP

(57) ABSTRACT

A modular reconfigurable bumper system for an off road vehicle includes a center base mountable to the front of the vehicle. The center base has ends, a top face, and a front face. A pair of first mounting locations having associated mounting holes are located on the front face of the center base adjacent its ends and a pair of second mounting locations having associated mounting holes are located on the top face adjacent the ends of the center base. A pair of third mounting locations are located on the ends of the center base. A plurality of optional accessories including end plates, end extenders, an overrider, a prerunner, a stinger, and D-rings are selectively mountable to the center base, all via the first, second, and third mounting locations. The system also includes a rear bumper assembly mountable to the back of the vehicle and having a hinged spare tire carrier and D-rings selectively attachable to the rear bumper via common fourth mounting locations.

21 Claims, 5 Drawing Sheets

(56) References Cited

OTHER PUBLICATIONS

Team Cherokee, www.teamcherokee.com, Catalog Page No. 14.

Olympic Auto Accessories, Chrome Performance, Rear Bumpers & Build-A-Bumper, p. 3.

Jeep TJ Wrangler—NightCrawler™ Modular Front Bumper—Skid Row Offroad, www.skidplates.com, 2006-2009 SFK Manufacturing, LLC, pp. 1-4.

Installation Instructions for NightCrawler™ Modular Front Bumper with Spotter's Lamps™, JP-0022 Aug. 1, 2008, Skid Row Offroad by SFK Manufacturing, LLC, pp. 1-2.

Installation Instructions for NightCrawler™ Modular Front Bumper with Rectangular Openings, JP-0021 Aug. 1, 2008, Skid Row Offroad by SFK Manufacturing, LLC, pp. 1-2.

2008 Bonus Edition "Essentials" for Jeep Vehicles—Quadratec JK Wrangler Buildup for '07-'09 JK Wrangler, www.quadratec.com, p. 3.

2008 Bonus Edition "Essentials" for Jeep Vehicles—Quadratec JK Wrangler New & Hot '07-'09 JK Wrangler, www.quadratec.com, p. 6.

2008 Bonus Edition "Essentials" for Jeep Vehicles—Quadratec Kentrol Protection, www.quadratec.com.

2008 Bonus Edition "Essentials" for Jeep Vehicles—Quadratec Olympic Rock Bumpers, www.quadratec.com, p. 128.

Olympic Auto Accessories, Catalog No. 10, 1 page.

Olympic Auto Accessories, Wrangler YJ Bumpers, Catalog Page No. 21.

MODULAR BUMPER SYSTEM

REFERENCE TO RELATED APPLICATION

This is a continuation of co-pending U.S. patent application Ser. No. 12/731,226 filed on Mar. 25, 2010, which is a continuation of application Ser. No. 12/288,901 filed on Oct. 24, 2008, now U.S. Pat. No. 7,703,834.

TECHNICAL FIELD

This disclosure relates generally to vehicle aftermarket accessories and more specifically to bumper systems for off road vehicles such as Jeep® brand vehicles.

BACKGROUND

Many owners and drivers of off road vehicles such as Jeep® brand vehicles choose to enhance their stock vehicles with aftermarket accessories. Such accessories might include, for example, driving lights, winches, wheels, suspensions, and the like. Some owners and drivers of Jeep® brand and other off road vehicles choose to replace the stock bumpers of their vehicles with aftermarket bumpers and bumper accessories that are more rugged, more useful, and, many believe, more stylish than stock bumpers. For example, an owner might replace the stock bumper with a bumper having a center bumper hoop, sometimes called an overrider, or a prerunner guard, or a center stinger hoop, or D-rings, or tapered ends for increased approach angles and to protect bumpers, or various combinations of such accessories. In the past, an owner typically would determine which bumper type he or she wanted, and order the bumper and accessories pre-fabricated from the manufacturer. Some manufacturers have offered bumper systems with provisions for bolting on certain accessories such as driving lights and bumper extensions.

SUMMARY

Then entire disclosures, including the claims, of co-pending U.S. patent application Ser. No. 12/731,226 filed on Mar. 25, 2010, and U.S. patent application Ser. No. 12/288,901 filed on Oct. 24, 2008, now U.S. Pat. No. 7,703,834, are hereby incorporated by reference in their entireties.

Briefly described, a completely modular bumper system according to the present disclosure includes a front bumper assembly having a center base designed to be bolted onto the frame at the front of a vehicle such as a Jeep® brand off road vehicle. The system includes a plurality of optional accessories that may be added to the center base to provide a wide variety of final configurations of the front bumper assembly according to the owner's needs and desires. For instance, the owner may decide to cap the ends of the center base with caps or bolt end extenders onto the ends of the center base to protect bumpers. The end caps and end extenders are freely interchangeable using common mounting locations. Similarly, the owner may choose to add an overrider, or a prerunner guard, or a center stinger, and each of these accessories is freely interchangeable as needed using the same mounting locations. D-rings may be added using the same mounting locations as the aforementioned accessories and various ones of all of these accessories may be mixed and matched to provide custom configurations of the bumper system according to the owner's needs. Thus, the front bumper assembly is freely reconfigurable as needed or desired and all optional accessories are attached via common mounting locations.

The system also includes a rear bumper assembly with fourth mounting locations each having a set of holes. A pair of brackets are securable to the frame at the rear of the vehicle and include mounting plates with holes that align with the holes of the fourth mounting locations. D-rings, a spare tire carrier, and perhaps other accessories are selectively mountable to the rear bumper also via the fourth mounting locations with bolts that extend through all of the accessories and the mounting plates of the brackets. The D-rings for the rear bumper are the same D-rings usable with the front bumper assembly so that the front and rear bumper assemblies use common D-rings. Thus, the rear bumper assembly is secured to the brackets and accessories such as common D-rings and a spare tire carrier are all selectively mountable to the rear bumper via the same common fourth mounting locations, making the rear bumper assembly modular and freely reconfigurable.

It will thus be seen that the bumper system of the present disclosure is completely modular with all optional accessories using common mounting locations, can be changed out quickly and easily, can be transformed to a different configuration as needed or desired, and provides for a wide variety of final configurations. These and other aspects, features, and advantages of the bumper system of this disclosure will be better understood upon review of the detailed description set forth below taken in conjunction with the accompanying drawing figures, which are briefly described as follows.

DETAILED DESCRIPTION

Figure 1:
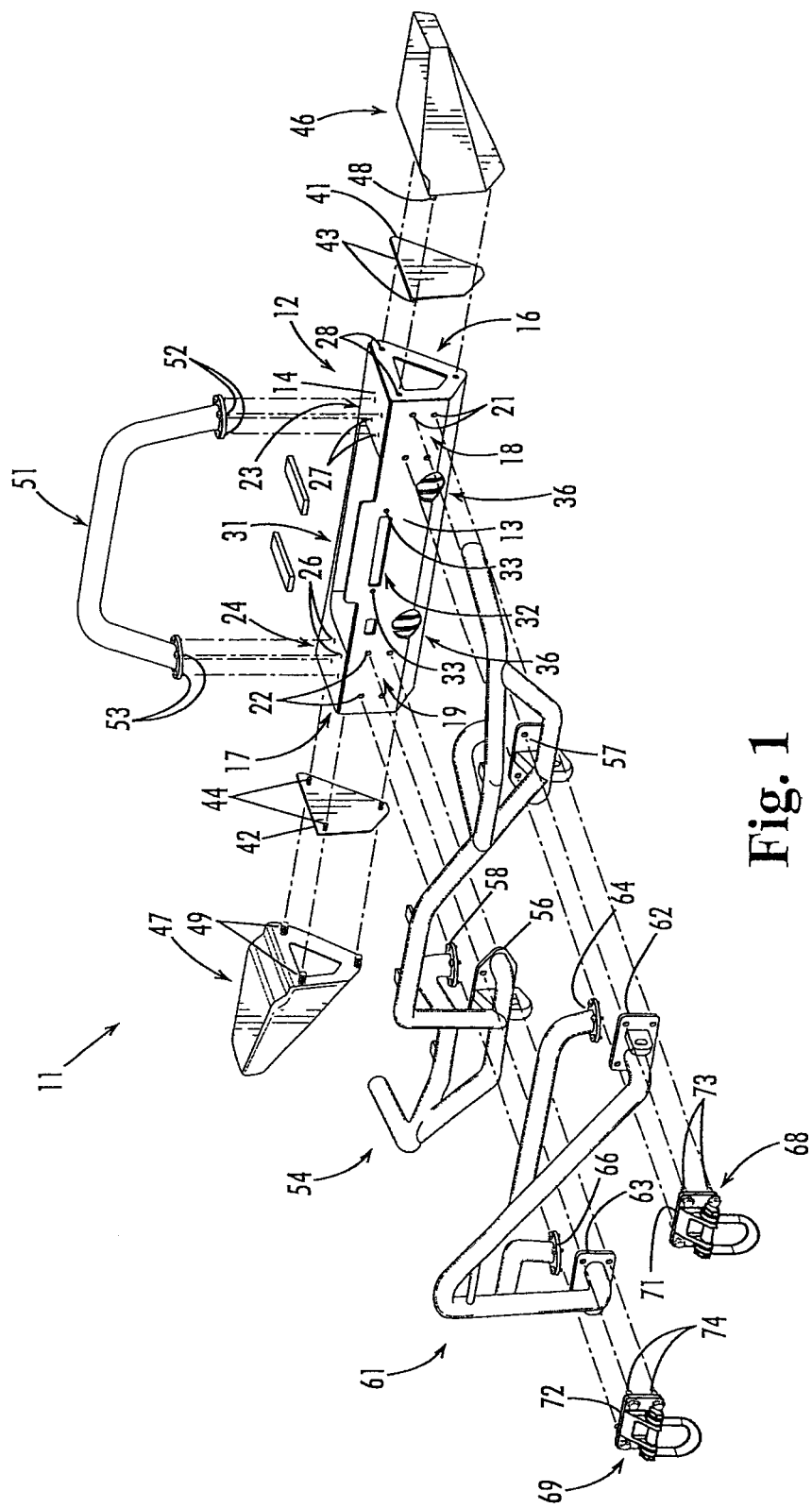
FIG. 1 is an exploded perspective view of a modular front bumper assembly that embodies principles of the present disclosure in a preferred form.

Referring now in more detail to the drawing figures, wherein like reference numerals indicate like parts throughout the several views, FIG. 1 illustrates a front bumper system or assembly that embodies principles of the invention in a preferred form. The front bumper system 11 comprises a center base 12 adapted to be bolted to the front of a vehicle, in this case a Jeep® brand off road vehicle. The center base 12 is made of heavy gauge steel and has a front face 13, a top face 14, a first end 16, and a second end 17. A pair of first mounting locations 18 and 19 are located on the front face 13 of the center base 12 adjacent the ends 16 and 17 respectively. The first mounting location 18 includes a set of mounting holes 21 and the first mounting location 19 includes a similar set of mounting holes 22, the holes in each case being arranged in a generally rectangular pattern. A pair of second mounting locations 23 and 24 are located on the top face 14 of the center base 12 adjacent the ends 16 and 17 respectively. Each of the second mounting locations includes a set of holes 26 and 27 respectively, which, in the illustrated embodiment, are arranged in a substantially square configuration. Each end 16 and 17 of the center base 12 forms a third mounting location characterized by a set of holes 28 and 29 (holes 29 are not visible in FIG. 1) arranged in a generally triangular configuration.

Figure 2:
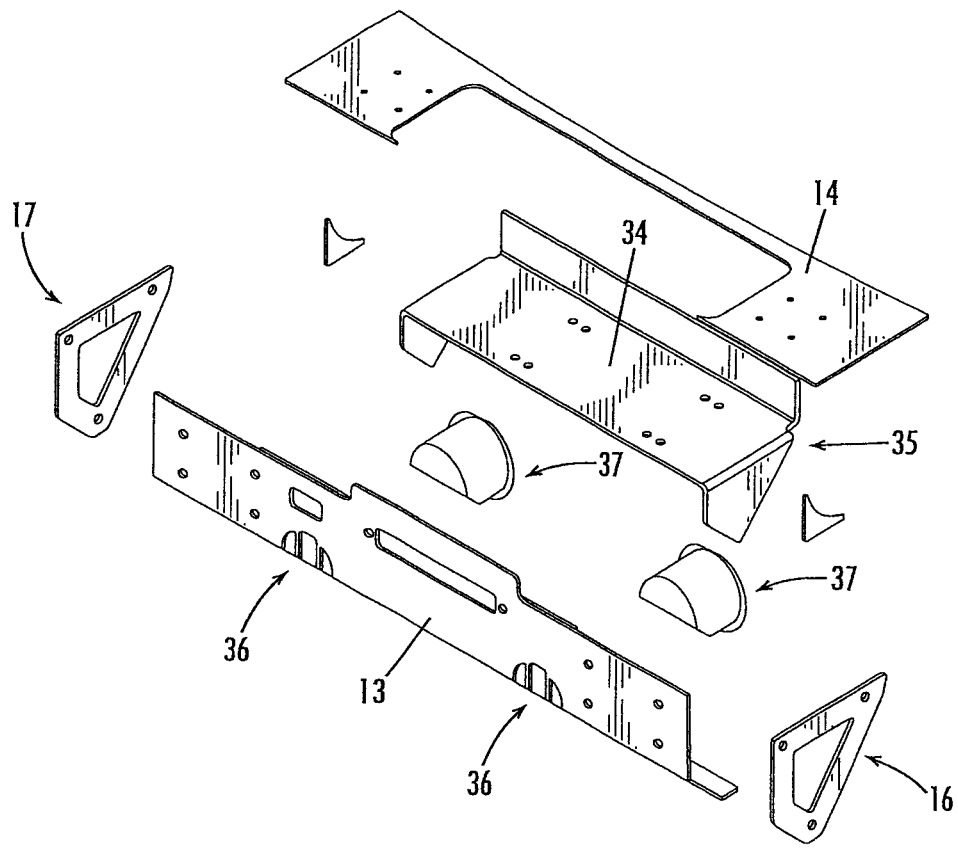
FIG. 2 is an exploded perspective view of the center base according to one embodiment.
Figure 3:
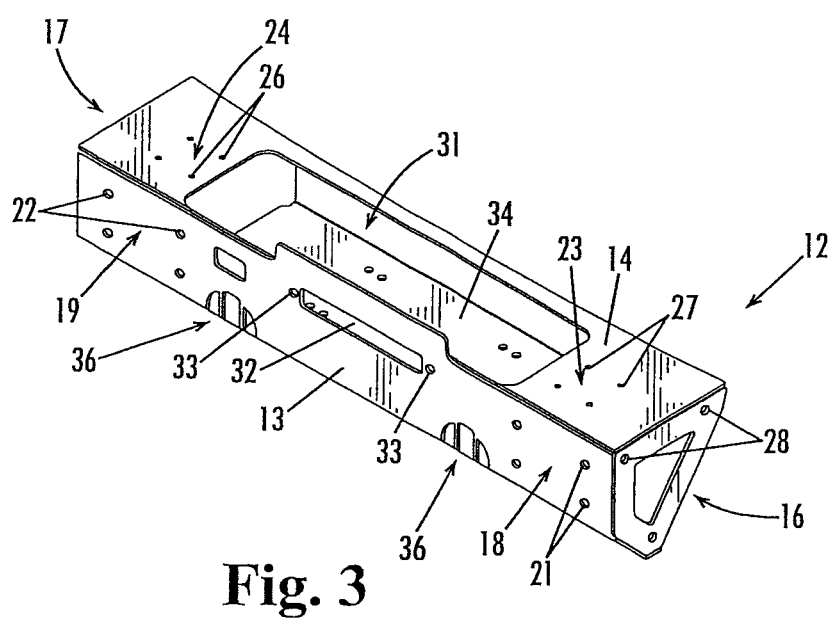
FIG. 3 is a perspective view of the center base of FIG. 2 shown in its unitary welded state.

The top face 14 of the center base 12 is provided with a winch bay 31 sized to accommodate an electric winch (not shown). The winch bay 31 has a floor 34 (FIG. 2) with mounting holes configured to accommodate a standard winch. In the embodiment of FIGS. 1-3, the floor 34 of the winch bay 31 is formed by a bay bracket 35 that is welded to the interior of the center base 12, as best illustrated in FIG. 2. A winch cable slot 32 is formed in the front face 13 of the center base and is sized so that a winch cable from a winch mounted in the winch bay can extend freely through the winch cable slot. Mounting holes 33 are provided to each side of the winch cable slot to accommodate a fairlead, such as a roller fairlead, a hawse fairlead, or an aluminum fairlead, bolted to the front face over the winch cable slot 32. A pair of driving light openings 36 are formed partially in the front face 13 of the center base and a corresponding pair of mounting sockets 37 (FIG. 2) are secured to the interior of the center base 12 behind the driving light openings. The mounting sockets preferably are sized and configured so that the stock driving lights of the vehicle, which normally are attached to the stock bumper, may be secured to the mounting sockets 37 during installation of the bumper system of this disclosure. The driving light openings are formed with spaced bars to protect the sockets and lights from debris during off road driving.

A pair of end plates 41 and 42 are sized and configured to be secured to the ends 16 and 17 respectively of the center base 12 via the third mounting locations. More specifically, the end plates 41 and 42 are provided with threaded studs 43 and 44 respectively that are positioned to be received in the holes 28 and 29 at the third mounting locations on the ends of the center base. The end plates 41 and 42 may be secured with appropriate washers and nuts (not shown) threaded onto the treaded studs inside the center base 12.

A pair of optional end extenders 46 and 47 are a part of the modular front bumper and may be secured to the ends 16 and 17 of the center base 12 via the third mounting locations as an alternative to the end plates 41 and 42. The end extenders 46 and 47 are provided with threaded studs 48 and 49 and these threaded studs are configured to be received in the same mounting holes 28 and 29 of the third mounting locations as the studs of the end plates for securing the end extenders to the ends 16 and 17 of the center base 12. As described in more detail below, the end extenders are formed with an up-swept configuration to accommodate high angles of attack in rough or rocky terrain while protecting the fenders of the vehicle from contact with rocks or debris during off road driving. The end extenders are freely interchangeable with the end plates via the third mounting locations, allowing the front bumper system to be reconfigured as desired for appearance or differing terrain.

An overrider bar or loop 51 is provided at its ends with circular mounting flanges with holes that receive bolts 52. The bolts 52 are positioned and arranged to be received in the holes 26 and 27 respectively of the second mounting locations for securing, with washers and welded-on nuts inside the center base, the overrider bar to the top face of the center base. An optional prerunner 54 is provided with front mounting plates 56 and 57 and top mounting plates 58 and 59 (plate 59 being obscured in FIG. 1). The front mounting plates 56 and 57 are provided with a set of holes that are configured to align with the holes 21 and 22 of the first mounting locations 18 and 19 when the prerunner 54 is mounted to the center base 12. The top mounting plates 58 and 59 are provided with holes that receive bolts that are positioned and configured to be received in the holes 26 and 27 of the second mounting locations 23 and 24 on the top face 14 of the center base 12 and threaded into welded-on nuts inside the center base. The prerunner can thus be selectively mounted to the center base 12 via the first mounting locations and the second mounting locations as an alternative to mounting an overrider bar via the second mounting locations, as desired by an owner. Again, the front bumper system is easily reconfigurable between these two alternatives using common mounting locations.

Similarly, a stinger loop or bar 61 is provided as an alternative to an overrider or prerunner. The stinger bar 61 has front mounting plates 62 and 63 and top mounting plates 64 and 66. The front mounting plates are provided with holes that align with the holes of the first mounting locations 18 and 19 on the front face 13 of the center base and the top mounting plates are provided with treaded studs positioned and configured to be received in the holes 26 and 27 of the second mounting locations 23 and 24 on the top face 14 of the center base. The stinger bar 61 can thus be mounted to the center base with appropriate bolts, washers, and nuts via the same first and second mounting locations used to mount other options such as the overrider 51 and the prerunner 54. Further, the front bumper is freely reconfigurable to replace other options with a stinger bar, using common mounting locations, as needed or desired to accommodate various types of terrain or driving conditions or to provide a look preferred by a vehicle owner.

As another alternative modular configuration, a pair of D-rings 68 and 69 have mounting plates 71 and 72 with holes configured to align with the holes of the first mounting locations 18 and 19 on the front face 13 of the center base 12. The D-rings may thus be selectively mounted to the center base with bolts 73 and 74 extending through the mounting plate holes and the holes of the first mounting locations and appropriate washers and nuts (not shown) inside the center base 12. As before, the front bumper system is freely reconfigurable by a vehicle owner to add D-rings when an overrider or a prerunner is not in use. Preferably, the stinger and prerunner are provided with plates to which traditional D-rings may be secured during use of the stinger or prerunner.

It will thus be appreciated that the front bumper system described above can be configured, at the whim or needs of a vehicle owner, in a large number combinations using common mounting locations on the center base 12. For example, an owner might choose a configuration with an overrider, end plates, and D-rings; or a configuration with an overrider, end extenders, and D-rings; or a configuration with a prerunner and end plates; or a configuration with a prerunner and end extenders; or a configuration with a stinger and end plates; or a configuration with a stinger and end extenders; or a configuration with D-rings and end plates; or a configuration with D-rings and end extenders; etc. Any of these and other configurations are easily and quickly achieved by interchanging the various optional components, and all components mount to the center base via the common first, second, and third mounting locations. The bumper system is therefore completely modular and freely reconfigurable as needed or desired.

FIGS. 2 and 3 illustrate in greater detail the center base 12 of the embodiment shown in FIG. 1. In the exploded perspective of FIG. 2, the center base is seen to be comprised of its front face 13, its top face 14, ends 16 and 17, a winch bay bracket 35 that defines the winch bay floor 34, driving light openings 36 formed at least partially in the front face 13, and driving light mounting sockets behind the driving light openings. The various components preferably are welded together and finished to provide a center base with a seamless unitary appearance. FIG. 3 illustrates the center base 12 as it appears after welding together of the above components. More clearly visible are the first mounting locations 18 and 19 with their associated holes 21 and 22, the second mounting locations 23 and 24 with respective holes 26 and 27, and the third mounting locations on the ends 16 and 17 with associated holes 28 and 29. The winch bay 31 of this embodiment, with its floor 34 formed by the winch plate 35, is clearly illustrated, as are the driving light openings 36 and winch cable slot 32 with holes 33 to accommodate a fairlead, as mentioned above.

Figure 4:
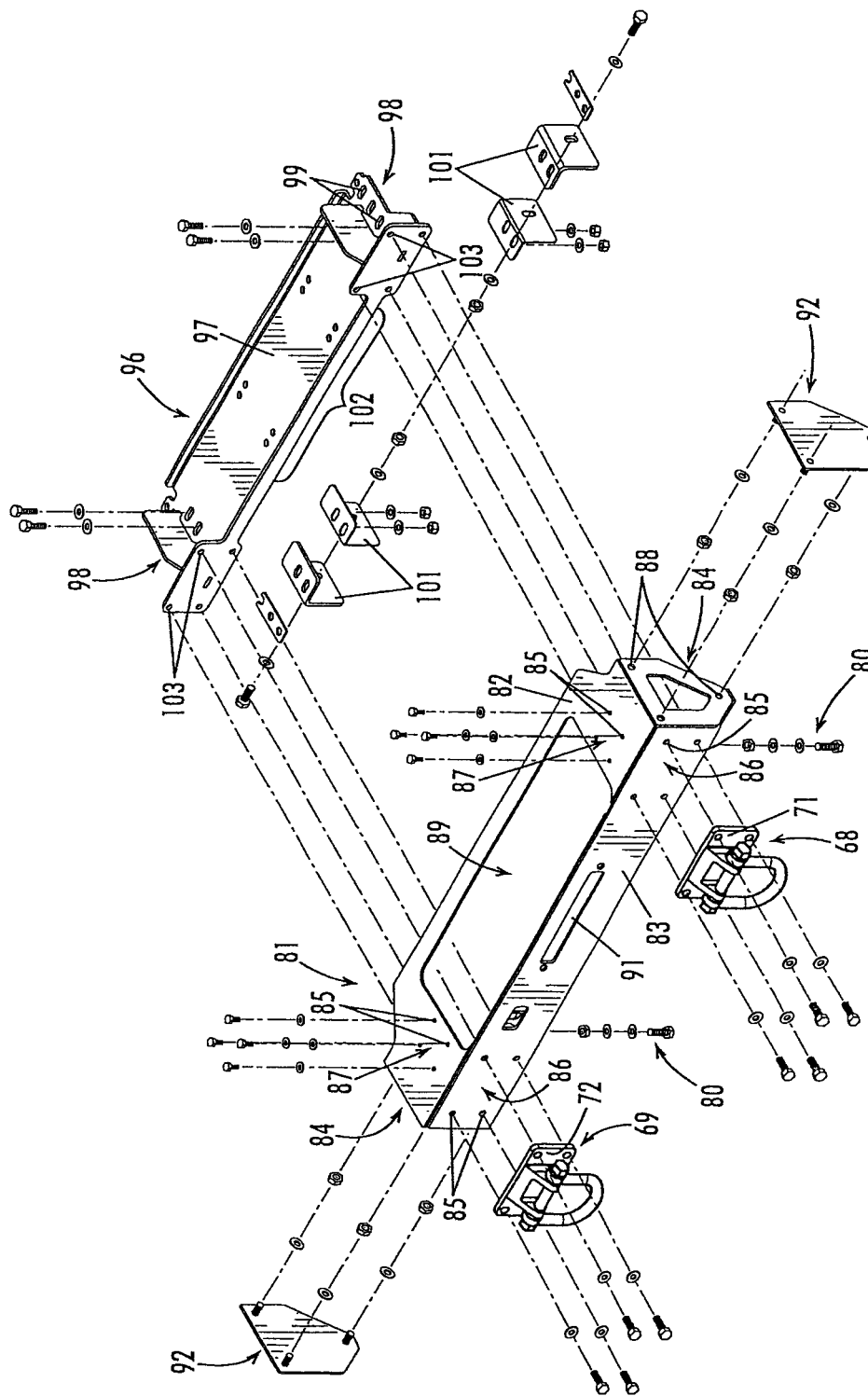
FIG. 4 is a perspective exploded view of another embodiment of the center base for adaptable mounting to a variety of vehicle models.

FIG. 4 is an exploded perspective of another embodiment of the center base of the present system for mounting to the front of a variety of vehicle models. In this embodiment, a center base 81 is similar in many respects to the center base 12 of the previously described embodiment. More specifically, the center base 81 has a top face 82, a front face 83, and ends 84. A pair of first mounting locations 86 are located on the front face 83 adjacent ends 84 and a pair of second mounting locations 87 are located on the top face 83 adjacent ends 84. Both the first and second mounting locations include holes 85 arranged in generally rectangular or square patterns as shown. A third mounting location is located at the ends 84 and includes holes 88 arranged in a generally triangular configuration. The top face 82 in this embodiment is provided with an opening that defines a winch bay 89, and a winch slot 91 is formed in the front face 83, although, unlike the prior embodiment, this configuration does not have driving light openings on the front face 83. Driving light openings may be provided if desired.

An adapter bracket 96 is formed with a plate 97 and end portions 98 provided with an array of mounting slots 99. A selection of mounting cleats 101 are provided, and each set of mounting cleats 101 is configured to be secured to the front frame of a different model vehicle, in this case various models and years of a Jeep® brand vehicle. The mounting cleats 101 are provided with horizontally extending wings having mounting slots that align with the mounting slots 99 on the end portions 98 of the adapter bracket 96. Once the mounting cleats 101 are bolted to the front of the vehicle frame, the adapter bracket 96 can be mounted to the horizontal wings of the cleats with appropriate bolts, washers, and nuts as shown to secure the adapter bracket 96 to the front of the vehicle. The adapter plate 96 is further provided with a forward plate 102 having mounting wings at its ends. A set of holes 103 are provided in the mounting wings and these holes 103 are positioned and arranged to align with the holes 85 of the first mounting locations 86 when the center base 81 is brought into engagement with the adapter bracket 96.

A pair of D-rings 68 have mounting plates 71 with holes that also align with the holes 85 of the first mounting locations and, consequently, also with the holes 103 in the wings of the forward plate 102 of the adapter bracket. To secure the center base 81 to the vehicle, the adapter bracket is first mounted to the vehicle, the center base is positioned on the adapter bracket with the holes 85 of the first mounting location aligned with the holes 103 of the forward plate 102. The D-rings are then brought into engagement with the front face of the center base with the holes of their mounting plates 71 aligned with the holes 85 of the first mounting locations 86. The assembly is then secured with appropriate bolts, as shown, which are extended through the holes of the D-rings, through the holes 95 of the first mounting locations, and through the holes 103 of the forward plate 102. The bolts, with appropriate washers, are threaded into welded-on nuts on the back of the forward plate 102 to secure the entire assembly together and to the vehicle. Thus, the center base is secured to the vehicle via the first mounting locations and the D-rings are secured to the center base also via the first mounting locations. When assembled, the plate 97 of the adapter bracket forms the floor of the winch bay and provides a support for a standard winch.

While not explicitly illustrated in FIG. 4, it will be understood that, just as in the embodiment of FIG. 1, a variety of optional and interchangeable accessories are part of the bumper system of this embodiment. For example, end plates 94 may be attached to the ends of the center base or, alternatively, end extenders may be attached. Further, an overrider bar, a prerunner, and a stinger hoop may be mounted to the center base at the option of an owner as described above relative to FIG. 1. In this embodiment, however, the prerunner and stinger hoop accessories each mount to the center base via the common first and second mounting locations and the center base is mounted to the adapter bracket also via the first mounting locations and via the bolts, washers, and welded-on nuts used to mount the prerunner or stinger hoop at the first mounting locations. Mounting bolts 80 also extend through holes on the bottom of the center base 81 and through the center bracket to provide an additional mounting location. Just as with the prior embodiment, the front bumper system is freely reconfigurable at any time to provide a variety of combinations of accessories for various driving conditions.

Figure 5:
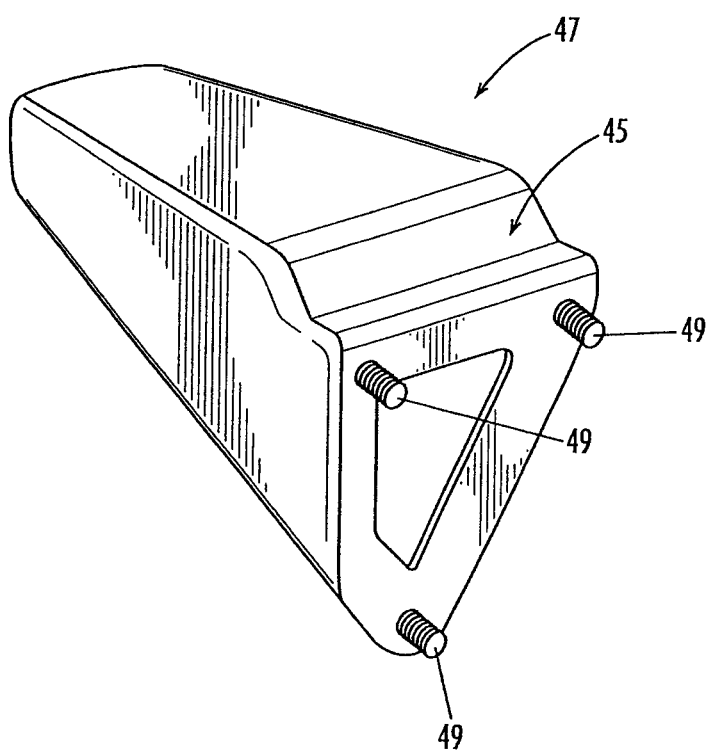
FIG. 5 is a perspective view of an end extender accessory showing mounting studs for selectively mounting to the end of a center base.

FIG. 5 is an enlarged perspective view of one of the end extenders according to this disclosure. The end extender 47 has an end provided with threaded studs 49 positioned and configured to be received within the holes of the third mounting location at an end of a center base, as described above. The end extender 47 has an upwardly sweeping bottom to accommodate high angles of attack of the vehicle when traversing, for instance, very rocky terrain. A ramp 45 is formed in the top surface of the end extender to raise the top surface to a more useful height and also to provide a unique and stylish appearance of the end extender.

Figure 6:
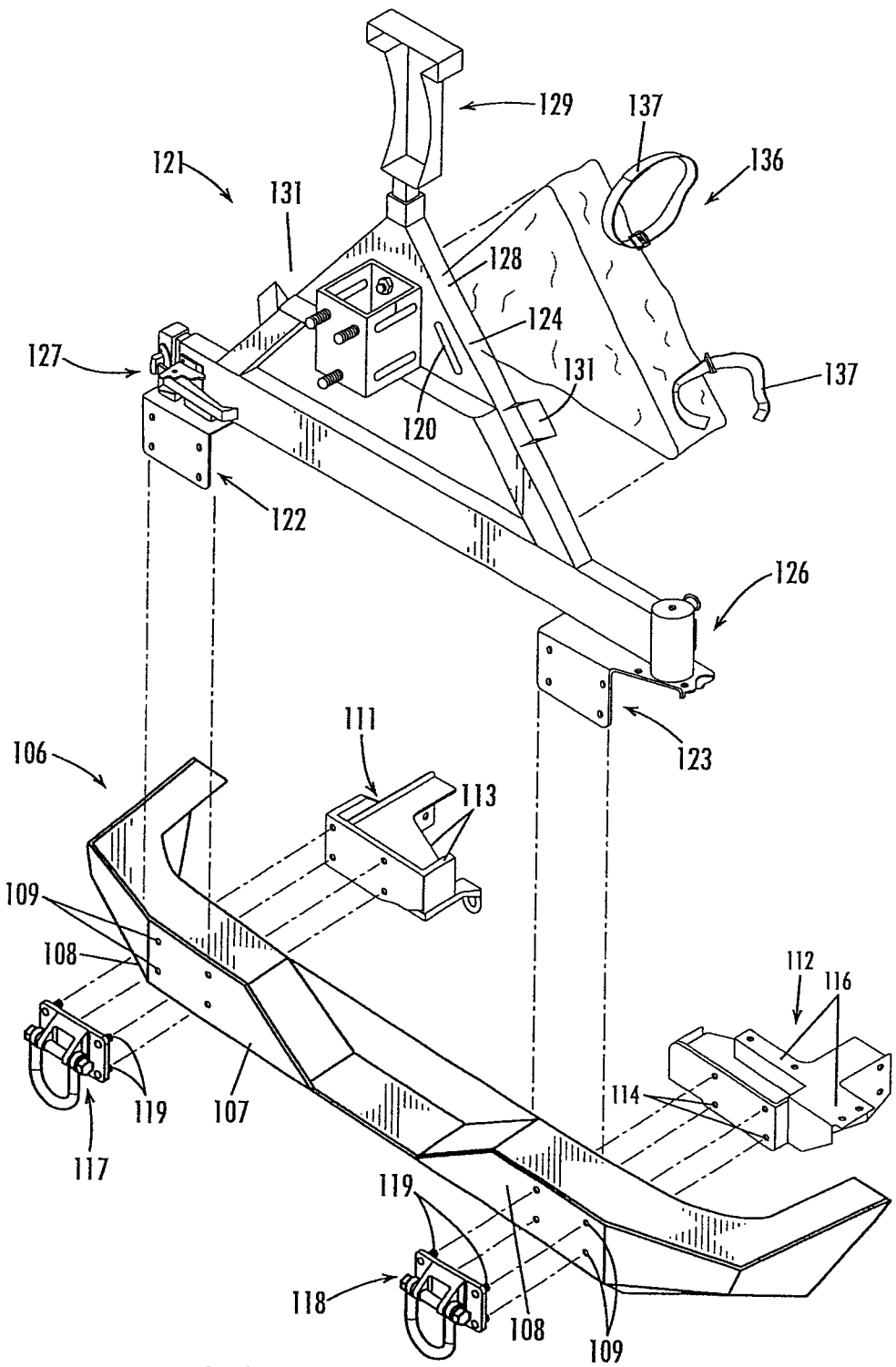
FIG. 6 is an exploded perspective view of a modular rear bumper assembly that embodies principles of the present disclosure in a preferred form.

FIG. 6 is an exploded perspective view of a rear bumper assembly that forms a part of the modular bumper system of this disclosure. As with the front bumper assemblies described above, the rear bumper assembly 106 is designed for mounting to a Jeep® brand vehicle, although the system of this disclosure certainly is not limited to a particular brand of vehicle. The rear bumper assembly includes a rear bumper 106 with a back face 107 provided with a pair of fourth mounting locations 108 having associated holes 109 arranged in a rectangular pattern. A pair of adapters 111 and 112 are configured to be mounted to the rear frame at the back of the vehicle. The adapter 111 has a back plate provided with a set of holes 113 and the adapter 112 has a back plate with a similar set of holes 114. When the adapters 111 and 112 are mounted to the back of the vehicle and the rear bumper 106 is brought into contact with them, the holes of the fourth mounting location align with the holes of the adapters for mounting the bumper to the adapters. Thus, the rear bumper 106 is mounted to the vehicle via the fourth mounting locations 108.

A pair of D-rings 117 and 118 have mounting plates with holes that align with the holes of the fourth mounting locations and thus also with the holes of the rear faces of the adapters 111 and 112. Thus, just as with the embodiment of FIG. 4, the D-rings are mounted with bolts, washers, and nuts, to the bumper and the bumper is mounted to the adapters with the same bolts, washers, and nuts via the common fourth mounting locations 108. A spare tire carrier is also mountable, if desired, to the rear bumper via the same common fourth mounting locations. More specifically, the spare tire carrier 121 includes brackets 122 and 123 having vertically extending wings with holes that align with the holes of the fourth mounting locations 108. A frame 124 is hingedly mounted to the bracket 123 by means of a pivoting hinge 126 and the other end of the frame 124 is releasably secured to the bracket 122 by means of a latch 127. A stringer 120 spans the arms of the frame 124 and carries a hub 128 having studs that receive the mounting holes of a spare tire (not shown) for mounting the tire to the spare tire carrier 121. A brake light housing 129 preferably extends upwardly from the frame 124 for receiving a third brake light, which in the preferred embodiment is stock factory third brake light of the vehicle, and elevating the light above a spare tire secured to the carrier. A pair of standoffs 131 project from the frame and are positioned to bear strategically against the vehicle to steady the spare tire carrier and help prevent it from rattling and shaking during off road driving. Shims (not shown) are strategically located within the latch region also to prevent rattling of the carrier during rough driving conditions.

As mentioned, the spare tire carrier is mountable to the rear bumper 106 via the same fourth mounting locations used to mount the D-rings to the bumper and the bumper to the adapters. More specifically, when the spare tire carrier is positioned atop the rear bumper 106 as illustrated by the phantom lines, the holes in the vertical wings of the brackets 122 and 123 come into alignment with the holes of the fourth mounting locations. The D-rings 117 and 118 can then be positioned atop the vertical wings and the entire assembly is secured together with bolts that extend through the D-ring mounting plates, through the vertical wings, through the rear bumper, and through the holes in the rear plates of the adapters to receive appropriate washers and nuts. Thus, the D-rings and spare tire carrier are mounted to the bumper via the fourth mounting locations 108 and the rear bumper is mounted to the adapters 111 and 112 and thus to the vehicle via the same fourth mounting locations 108. This modular configuration renders the rear bumper assembly adaptable and easily reconfigurable as is the front bumper assembly as described above.

A tire carrier recovery bag 136 is sized to fit between the arms of the frame behind the stringer 120, where it is secured in place with appropriate Velcro straps 137 that wrap around the arms of the frame. The upper Velcro straps extend through the slots in the stringer 120. The tire carrier recovery bag may be used to carry tools, road accessories, or any other items that a user might want to store and carry in the bag.

The invention has been described herein in terms of preferred embodiments and methodologies considered by the inventors to represent the best mode of carrying out the invention. It will be understood by skilled artisans, however, that a wide variety of equivalent substitutions and modifications might be made within the spirit of the invention. For instance, while all embodiments of the front bumper assembly have been illustrated with winch bays for a winch, a winch bay is not a requirement of the invention and the center base might just as readily be formed without a winch bay. The particular shapes of the various components are exemplary, and it will be understood that similar components with a variety of different shapes and configurations might be substituted with equivalent results. Also, many components not specifically illustrated and described above may be provided for selective attachment to the bumper assemblies via the common mounting locations according to the invention, such that the invention is not limited to the specific components chosen to illustrate the invention herein. Components may be provided in a variety of finishes such as, for instance, a black finish, polished stainless steel, and/or a chrome finish, which increases even more the numbers of different possible configurations of the modular bumper system. These and other additions, deletions, and modifications might be made by those of skill in the art without departing from the spirit and scope of the invention as set forth in the claims.

What is claimed is:

1. A modular bumper system comprising:
    a center base having a length, a front portion, a top portion, and ends and being generally horizontally oriented when attached to a vehicle;
    first mounting locations comprising sets of holes on the top portion of the center base;
    second mounting locations comprising sets of holes on the ends of the center base;
    a plurality of accessories each being optionally attachable to the center base to form a bumper of a predetermined configuration;
    the plurality of accessories including at least a pair of end extenders selectively attachable to the center base via the second mounting locations, the end extenders, when attached, extending the length of the center base and being formed with an up-swept configuration relative to the center base, and an overrider loop having ends that are selectively attachable to the center base at least via a set of holes of the first mounting locations, the overrider loop, when attached, comprising a bar that extends at least upwardly from the ends of the overrider loop to a position above the center base.

2. A modular bumper system as claimed in claim 1 further comprising third mounting locations comprising sets of holes on a front portion of the center base, the plurality of accessories further comprising a pair of D-rings selectively attachable to the center base via a set of holes of the third mounting locations.

3. A modular bumper system as claimed in claim 2 and wherein the plurality of accessories further includes a stinger loop selectively attachable to the center base at least via a set of holes of the first mounting locations, the stinger loop, when attached, extending upwardly and forwardly from the center base.

4. A modular bumper system as claimed in claim 2 and wherein the plurality of accessories further includes a stinger loop selectively attachable to the center base at least via the first mounting locations, the stinger loop, when attached, extending upwardly and forwardly from the center base.

5. A modular bumper system as claimed in claim 2 and wherein the plurality of accessories further includes a stinger loop selectively attachable to the center base via the first and second mounting locations, the stinger loop, when attached, extending upwardly and forwardly from the center base.

6. A modular bumper system as claimed in claim 2 and wherein the plurality of accessories further includes a prerunner selectively mountable to the center base at least via the second mounting locations, the prerunner, when mounted, extending forwardly from the center base.

7. A modular bumper system as claimed in claim 2 and wherein the plurality of accessories further includes a prerunner selectively mountable to the center base at least via the first mounting locations, the prerunner, when mounted, extending forwardly from the center base.

8. A modular bumper system as claimed in claim 2 and wherein the plurality of accessories further includes a prerunner selectively mountable to the center base via the first and second mounting locations, the prerunner, when mounted, extending forwardly from the center base.

9. A modular bumper system as claimed in claim 2 and wherein the plurality of accessories further includes a pair of end plates selectively mountable to the center base at least via the third mounting locations.

10. A modular bumper system as claimed in claim 1 and wherein the accessories are selectively attachable to the center base with bolts.

11. A modular bumper system as claimed in claim 1 and further comprising a winch bay formed in the center base for receiving a winch.

12. A modular bumper system as claimed in claim 11 and further comprising a winch cable opening formed in the front face of the center base.

13. A modular bumper system as claimed in claim 12 and wherein the winch cable opening is configured to receive a fairlead selected from the group consisting essentially of a roller fairlead, a hawse fairlead, and an aluminum fairlead.

14. A modular bumper comprising a base having a length and being attachable to a vehicle, the base including a front surface, an upper surface having a first pair of mounting locations and ends having respective second mounting locations, a pair of end extenders formed with an up-swept configuration relative to the base and being removably mounted to respective ones of the ends via the second mounting locations to extend the length of the base, a pair of towing members removably mounted to the base, and a third accessory removably mounted at least to the upper surface of the base via the first pair of mounting locations.

15. A modular bumper as claimed in claim 14 wherein the towing members each comprises a D-ring.

16. A modular bumper system as claimed in claim 15 wherein the front surface of the base has a third pair of mounting locations, the D-rings being removably mounted to the base via the third pair of mounting locations.

17. The modular bumper of claim 14 and wherein the third accessory comprises a overrider including a bar having ends mounted to the top surface of the base via the first pair of mounting locations and extending at least upwardly from the base to a position above the base.

18. The modular bumper of claim 14 and wherein the third accessory comprises a prerunner extending forwardly from the base.

19. The modular bumper of claim 18 and wherein the prerunner also is removably mounted to the front surface of the base via the third pair of mounting locations.

20. The modular bumper of claim 14 and wherein the third accessory comprises a stinger loop extending upwardly and forwardly from the base.

21. The modular bumper of claim 20 and wherein the stinger loop also is removably mounted to the front surface of the base via the third pair of mounting locations.

* * * * *